[19] United States Patent
Yonezawa et al.

[11] 4,223,187
[45] Sep. 16, 1980

[54] METHOD AND APPARATUS FOR RECORDING AND REPRODUCING A VIDEO-DISC WITH AN OSCILLATED TRACK

[75] Inventors: Seiji Yonezawa, Hachioji; Teruichi Tomura, Kunitachi; Akira Fukuhara, Tachikawa; Keizo Kato; Masuo Umemoto, both of Hachioji, all of Japan

[73] Assignee: Hitachi, Ltd., Japan

[21] Appl. No.: 785,847

[22] Filed: Apr. 8, 1977

Related U.S. Application Data

[63] Continuation of Ser. No. 439,039, Feb. 4, 1974, abandoned.

[30] Foreign Application Priority Data

Feb. 2, 1973 [JP] Japan .................................. 48-12968

[51] Int. Cl.² .............................................. H04N 5/76
[52] U.S. Cl. ........................... 179/100.1 G; 358/128.5; 179/100.3 V; 179/100.3 D; 360/77; 346/108; 250/202; 274/46 R
[58] Field of Search ................. 179/100.3 V, 100.3 D, 179/100.32, 100.3 N, 100.4 A, 100.4 C; 340/173 LM; 274/46 R; 358/128, 127, 130, 132; 360/77; 250/201, 202, 203, 570; 346/108, 137, 76 L; 365/120, 44, 127

[56] References Cited

U.S. PATENT DOCUMENTS

| 1,917,003 | 7/1933 | Williams | 179/100.3 V |
| 2,851,521 | 9/1958 | Clapp | 358/217 |
| 3,860,766 | 1/1975 | Mori | 179/100.4 R |
| 3,931,460 | 1/1976 | Watson | 358/128 |

Primary Examiner—James W. Moffitt
Assistant Examiner—Alan Faber
Attorney, Agent, or Firm—Craig & Antonelli

[57] ABSTRACT

In order to record information spirally on a disk and to reproduce the recorded information accurately without any contact, at the recording, an information signal and a predetermined signal for synchronous detection are added together, the resultant signal is subjected to frequency modulation and, while a laser beam intensity-modulated by the frequency-modulated signal is minutely swung in the radial direction of the rotating disk at the same frequency as that of the synchronous detection signal, it is caused to impinge on the disk to thereby record the information spirally on a recording medium of the disk without any contact. During the reproduction, as the disk is being rotated, a light spot is caused to impinge along an information groove formed on the disk, and reflected light or transmitted light from the disk is detected in the form of an electric signal. A synchronous detection signal is derived from the electric signal and an envelope signal of the electric signal is synchronously rectified by the use of the snychronous detection signal to thus detect the offset between the light spot and the information groove and, as the offset is being corrected, the information signal is reproduced.

32 Claims, 8 Drawing Figures

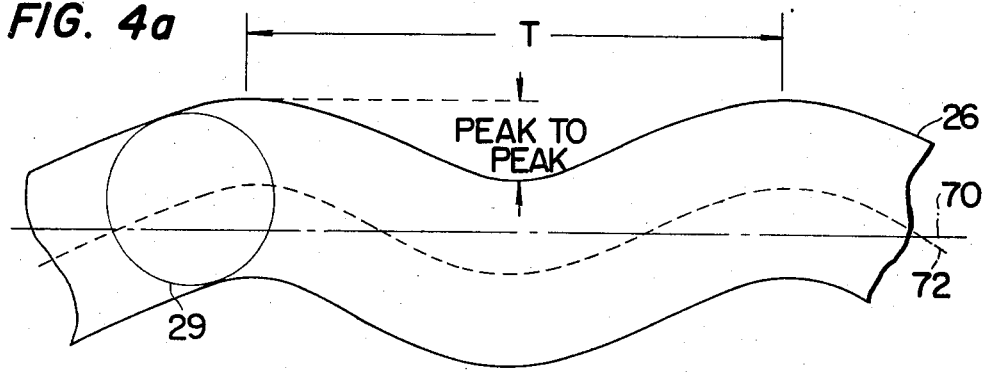
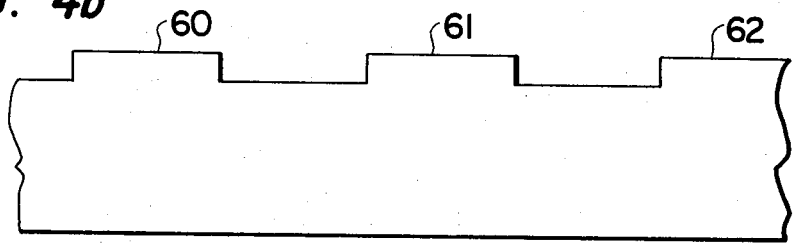
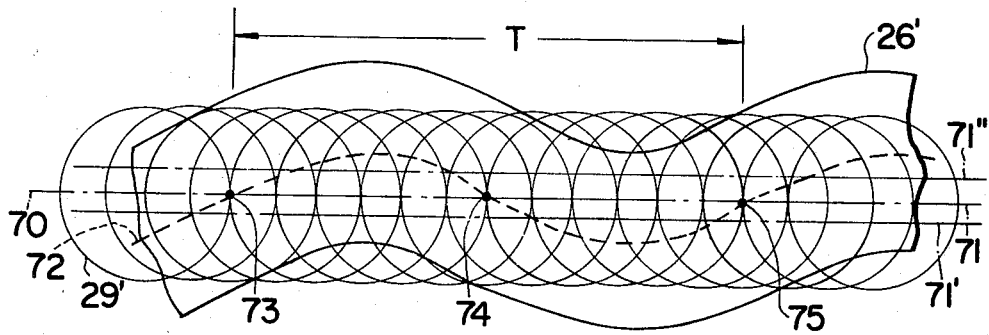
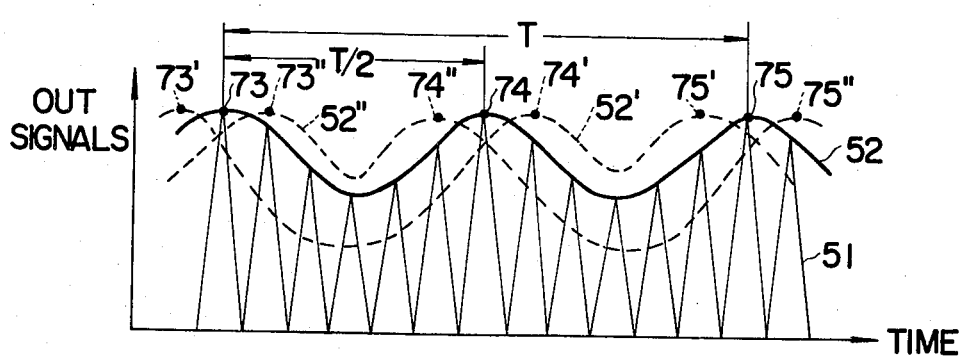

METHOD AND APPARATUS FOR RECORDING AND REPRODUCING A VIDEO-DISC WITH AN OSCILLATED TRACK

This is a continuation of application Ser. No. 439,039, filed Feb. 4, 1974, now abandoned.

BACKGROUND OF THE INVENTION

This invention relates to a method and apparatus for recording information, such as video and/or audio information, at high density on a storage disk of photo or electron-sensitive material, and also to a method and apparatus for reproducing such recorded information.

More particularly, it relates to a method and apparatus for recording and reproducing information in which an information groove in a recording system is formed into a special one, whereby the recorded information are reproduced accurately, in regular sequence and without any contact.

DESCRIPTION OF THE PRIOR ART

It is the recent trend to record information, such as video signals and computer data, on a recording medium, such as disk and tape, without any contact and at high density and reproducing the recorded information in regular sequence and without any contact. According to one proposal, an original plate is prepared in such a way that the information modulated into binary form is recorded spirally on a rotating disk in the form of unevenness or gradation without any contact, by the use of a light beam or electron beam. Thereafter, a number of copy disk sheets are prepared from the original plate. By this technique it is intended to reproduce the information from the copy sheets in regular sequence and accurately without any contact, by the use of a light beam. With a prior-art system in which a record for audio information is prepared and in which the audio information is reproduced from the prepared record by the use of a stylus, in the recording of video information etc. it is very difficult to make the density high. The aforecited proposal therefore attempts to attain a high density in such a way that the disk coated with a photosensitive material is irradiated by the light beam modulated by binary information, to thereby record the information in the form of unevenness or gradiations without any contact, and that the recorded information of the disk is reproduced without any contact by also employing the light beam during reproduction. While, according to this proposal, it is a problem as to how the recording is to be carried out with high precision, the most difficult problem is how the recorded information is reproduced in regular sequence without any contact by the use of the light beam.

Supposing, by way of example, that a television program for 30 minutes is recorded in binary form on a disk having a diameter of 30 cm and rotating at 1800 r.p.m.; the recording density will be very high. This becomes apparent when the recording density is concretely calculated by setting the highest frequency of video signals at 7 MHz. FIG. 1 provides an illustration of this.

In the figure, reference numeral 1 designates a disk, which has a center of rotation 2. Symbols 3, 3', ... and $3^N$ (where N denotes the $54 \times 10^4$-th) indicate tracks of an information groove (here, the "information groove" is rather close to an array of information elements than one which signifies the groove shape in the exact sense of the words). Shown at 4,4' ... and $4^N$ are information elements which are arrayed in the information tracks 3,3' ... and $3^N$, respectively. According to the calculated result, the width of each information track formed in the disk 1 as measured in the radial direction is $0.92\mu$, while the gap between the adjacent information tracks is also $0.92\mu$.

Where it is intended to record on the disk the high density information as seen from the above calculated result and to reproduce the same, the recording system can effect high density and high precision recording by designing a disk rotating system with a very good machine precision, so as to suppress disturbances arising from the eccentricity of the disk, the vibration of a motor, etc. As regards the reproducing system, however, the precision cannot be raised from the viewpoint of cost, and the disturbances of the eccentricity of the disk, the vibration of a motor, etc. make it extremely difficult to reproduce the information along the predetermined information groove. More specifically, in the reproducing system, the eccentricity of the disk amounts usually to 50–100 $\mu$m. Assuming, by way of example, that the rotational frequency of the motor for rotating the disk is 30 Hz (1800 r.p.m.), disturbance vibrations to the extent of a frequency ten times as high as the mentioned value, i.e., to the extent of 30 Hz, are generated. In this case, in the high density disk in FIG. 1, the information groove deviates by approximately 25–50 tracks at the speed of 300 Hz. It is absolutely impossible to accurately track the information groove and to reproduce the information in regular sequence.

That is, even when it is attempted to reproduce spirally recorded information by rotating the disk subjected to the high density recording and by feeding the light beam from the outer edge of the rotating disk towards the center thereof, a successful attempt is impossible on account of the disturbance vibration of the rotating disk, etc.

The prior art, therefore, has adopted a method to be described hereunder, so that the recorded information may be reproduced in regular sequence even in the presence of the disturbance vibration etc. One of the information tracks in FIG. 1 is magnified at a high magnification by means of an optical lens system, and the magnified image is received by a plurality of photodetectors. If the disk has an eccentric vibration at that time, the position of the magnified image will shift on the light receiving faces of the plurality of photodetectors and, hence, the magnitudes of signals detected by the respective photodetectors will differ. While the magnitudes of the output signals from the photodetectors are being compared, the deviation of the information groove due to the eccentric vibration of the rotating disk is detected. With the deviation made a control signal, the tracking of the information groove is performed.

In the prior art method stated above, the most serious disadvantage is that the control signal for tracking is affected by stray light noise. More specifically, the reproduction with the light beam is inevitably attended by stray light due to sunlight, a fluorescent lamp and to back reflection from optical components for the light beam for reproduction. Most frequencies of the stray light noise are lower than several hundreds Hz, while the frequency characteristic of the eccentricity of the rotating disk lies substantially in the same range. This means that the frequency bands of the stray light noise and the tracking control signal overlap each other in the prior art method stated above. In other words, the tracking control signal cannot be accurately detected.

SUMMARY OF THE INVENTION

An object of this invention is to provide a method and apparatus for recording and reproducing information, which record video signals and/or audio signals or information such as computer data on a rotating disk in binary form and at high density without any contact and which includes a novel method and apparatus for generating a tracking control signal for reproducing the recorded information accurately and contactlessly with a light beam, without being obstructed by a disturbance vibration of the rotating disk or by stray light.

The fundamental principle for accomplishing the object will be explained hereunder.

In order to precisely effect tracking during reproduction, the following steps are performed during recording. A standard signal for synchronous detection $f_o$ is added to an information signal for recording and reproduction. The resultant signal is subjected to a modulation, significant for phase information such as frequency modulation, the pulse width modulation and pulse position modulation (hereinbelow, generally termed binary modulation). Using the modulated signal, a light or electron beam or the like (hereinafter termed the working beam) for modifying a recording medium on the disk is subjected to intensity modulation. While the intensity-modulated working beam is being minutely swung in the radial direction of the disk with a signal of the same frequency and phase as those of the synchronous detection standard signal, it impinges spirally with a minute radial peturbation on the rotating disk. When an after-treatment is carried out, the recording of the information is completed. Subsequently, a copy of the disk having the recording completed is prepared. (Since the process of preparing the copy is not necessary for an understanding of this invention, an explanation thereof is omitted).

There will now be described the principle for reproducing the recorded information from the copy disk in regular sequence and accurately. The copy disk is rotated at a predetermined speed, a microspot of the light beam such as laser is caused to impinge along the information groove on the copy disk, and the reflected light or transmitted light (hereinbelow termed the secondary light) is converted into an electric signal with photoelectric conversion means. The electric signal is demodulated, to extract the synchronous detection standard signal $f_o$ referred to previously. Using the synchronous detection standard signal $f_o$, the envelope signal of the signal amplitude of the electric signal is synchronously rectified. Thus, a tracking control signal is obtained. The tracking control signal indicates the quantity and direction of the offset in the radial direction of the disk between the center of the microspot of the light beam and the swing center line of the information groove minutely swinging on the disk. Therefore, when the light beam is deflected in the direction opposite to that of the offset by the use of the tracking control signal, it can accurately track along the swing center line of the recorded information groove. Then, the information can be accurately reproduced by demodulating the electric signal and extracting the information signal.

Further, according to this invention, in order that the tracking control signal may be derived without being obstructed by stray light previously explained, the synchronous detection standard signal $f_o$ to be introduced at the recording is set at a frequency higher than the frequency components of the stray light.

In the above description of the principles of this invention, no reference has been had to a rotating mechanism which rotates the disk at the fixed speed during the recording and the reproduction and to a mechanism which moves the working beam or the reproducing light beam from the outer edge towards the center of the disk at the fixed speed so as to spirally record or reproduce the information. They are realizable with a conventional method and apparatus and hence have been omitted from the description. The same applies to the following explanation.

Other particulars of this invention will become more definite from the following description of the preferred embodiments taken in conjunction with the accompanying drawings.

BRIEF DESCRIPTION OF THE DRAWINGS

FIGS. 4a and 4b are a plan view and a sectional view of an information groove on the disk as formed by the information recording system according to this invention, respectively;

FIG. 6a and FIG. 6b are diagrams for explaining a method for detecting a tracking control signal in the information reproducing system according to this invention.

DESCRIPTION OF THE PREFERRED EMBODIMENTS

Figure 1:
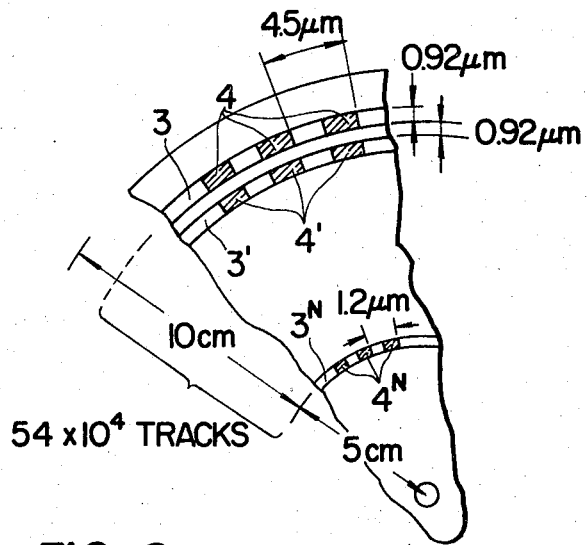
FIG. 1 is a diagram of an example illustrating the recording density of a disk in this invention.

First of all, a method and apparatus for recording information according to this invention as employ a light beam (for example, a laser) as the disk working beam will be described in detail with reference to FIG. 2.

In the figure, numeral 20 designates a disk whose center of rotation is shown at 21. Numeral 22 indicates a light-sensitive material applied on the disk surface. It may be, for example, a photoresist material which forms concave and convex parts upon irradiation by light, an emulsion which forms lights and shades (such as silver salt materials), or an opto-magnetic material which creates a magnetic change (such as MnBi). Numeral 26 denotes an information track. A light beam source 27 is constructed of, for example, a He-Cd laser generator which causes the photoresist to be altered by its light or a He-Ne source which changes the orientation of the magnetic poles of MnBi. Shown at 28 is a light beam, which is finally converged into a microspot 29. Numeral 30 denotes a condensing optical system, 31 light deflecting means (which consists of a light deflector 31' and a driver circuit therefor 31''), and 32 light beam intensity modulating means (which is, for example, an optical modulator employing a DKDP crystal). Shown at 33 is a light beam which has been subjected to intensity modulation. Adding and modulating means 34 is connected to frequency converters 35 and 35'. Numeral 36 represents an information source, 37 means to generate a standard signal for synchronous detection, and 38 the output of the adding and modulating means 34. The mechanism for rotating the disk 20 and the mechanism for moving the microspot 29 from the outer edge of the disk 20 towards the center of rotation 21 at a fixed speed and thus forming the track spirally or the mechanism for moving the light deflecting means 31 and the condensing optical system 30 have hitherto been known as previously stated, and hence, they are omitted in the figure.

The system operates as follows. Two signals from the information source 36 and the synchronous detection standard signal ($f_o$) generating means 37 are added together. It is preferable that, prior to the addition, the two signals be separated in frequency. The incorporation of the frequency converter 35 and 35' is based on the necessity for the separation of the two signals. The two converters 35 and 35', however, are not always necessary. If the separation of the two signals is possible with either one converter, the single converter will suffice naturally. If the two signals are originally separated frequency-wise, no frequency conversion will be necessary. Even when the two signals are added without being separated frequency-wise (that is, even when the synchronous detection standard signal $f_o$ is inserted into the information signal band), the information signal and the synchronous detection standard signal can be separated at reproduction by removing the synchronous detection standard signal in the information signal band by utilizing a trap filter. In this case, although the quality of a reproduced picture is somewhat degraded, no problem arises in practical use.

The two signals as processed are supplied to the adding and modulating means 34. After being added together, they are subjected to binary modulation explained previously.

The signal 38 thus modulated is supplied to the light beam intensity modulating means 32. If necessary, the modulation signal 38 may be initially amplified. Due to the light beam intensity modulating means 32, the light beam 28 generated from the light beam source 27 is subjected to intensity modulation corresponding to the modulation signal 38.

The intensity-modulated light beam 33 converges onto the photosensitive material 22 on the rotating disk 20 by the light deflecting means 31 as well as the condensing optical system 30. In this manner, the information track 26 is formed spirally on the disk 20. At this time, while, by delivering to the light deflecting means 31 a signal having the same frequency and phase as the output $f_o$ of the synchronous detection signal generating means 37, the light beam 28 is minutely swinging in the radial direction of the disk, in other words, the center of the light beam is meandering, the light beam is shifted spirally towards the center and impinges on the rotating disk so as not to overlap the adjacent tracks of the information track. The swing of the information track 26 thus formed is in synchronism with the synchronous detection signal $f_o$ added to the information signal. This is the most important point for the feature of the present invention that, even when the disk undergoes such disturbances as vibration and eccentricity at the reproduction, information is read out in regular sequence. This point will become more apparent from the explanation of a reproducing system to be presented later.

Figure 3:
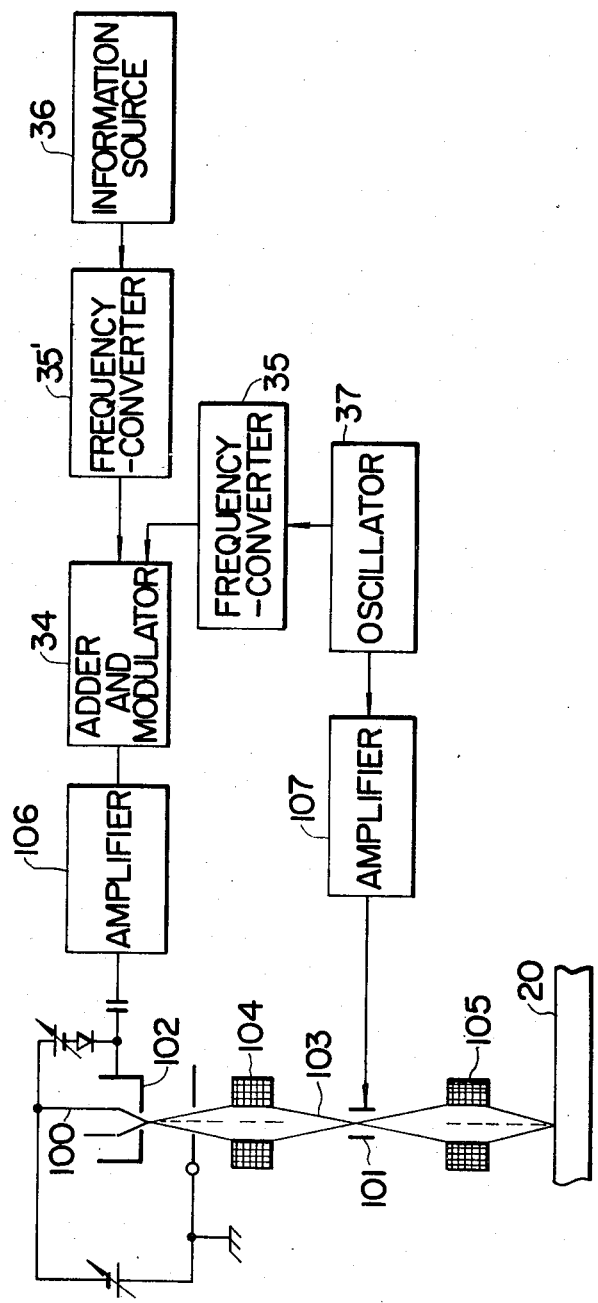
FIG. 3 is a diagram of another embodiment of the information recording system according to this invention, in which an electron beam is used as the disk working beam.

Referring now to FIG. 3, description will be made of information recording apparatus according to this invention in which an electron beam is employed as the disk working beam.

Figure 2:
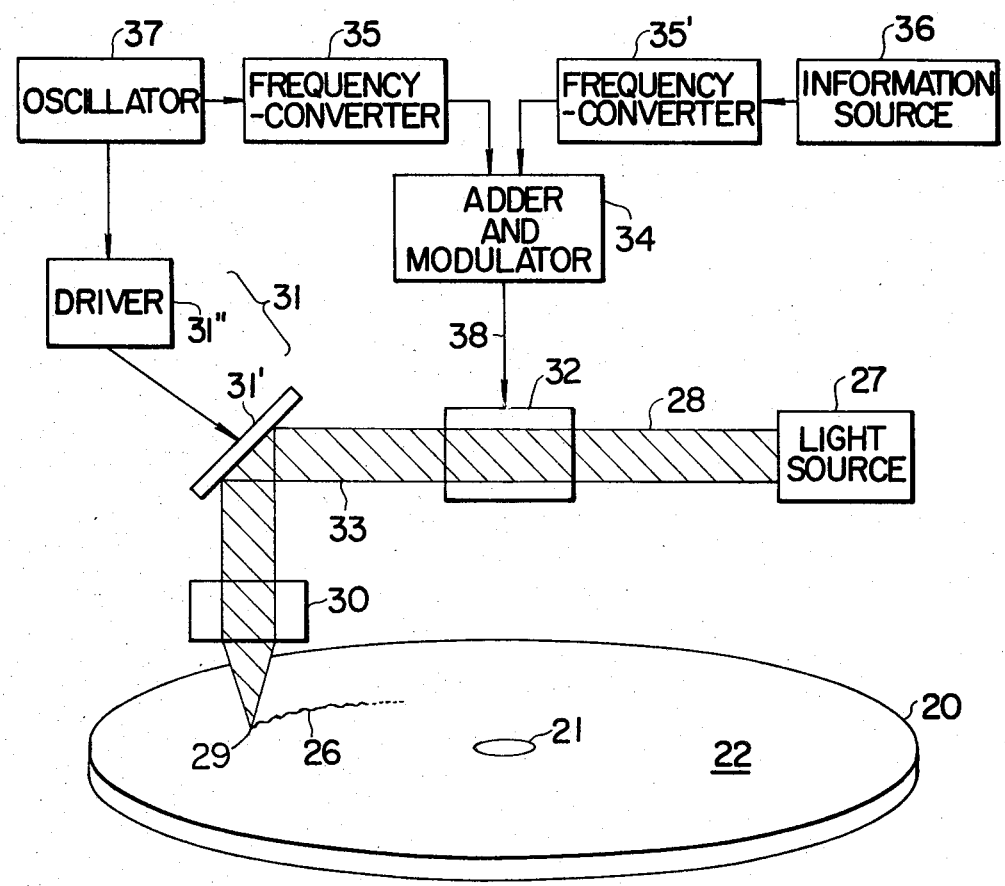
FIG. 2 is a diagram of an embodiment of an information recording system according to this invention, in which a light beam is used as a disk working beam.

In the embodiment in FIG. 3, an electron ray-sensitive material is substituted for the photosensitive material 22 in FIG. 2, an electron beam source 100 for the light beam source 27, an electron beam 103 for the light beam 28,33, electron lenses 104 and 105 for the condensing optical system 30, electron beam deflecting means 101 for the light deflecting means 31, and electron beam intensity modulating means 102 for the light beam intensity modulating means 32. The operation is the same as in the foregoing case of the light beam, and the same result can be achieved. In FIG. 3, numerals 106 and 107 designate amplifiers.

In recording information by the use of the electron beam, the electron beam radiated from the electron beam source 100 being an electron gun cathode is intensity-modulated by the control electrode or the electron beam intensity modulating means 102 to which the modulation signal 38 is applied. After being converged by the first elecron lens 104, the modulated electron beam is minutely swung by the deflecting coil or the deflecting electrode, namely, the electron beam deflecting means 101 to which the output of the synchronous detection signal generating means is applied. The swinging electron beam converges onto the rotating disk due to the second electron lens 105.

Description will now be made of the shape of the information track of the disk formed by the foregoing recording apparatus of this invention, reference being had to FIGS. 4a and 4b. FIG. 4a is a diagram showing to enlarged scale a single track of the information groove on the disk, while FIG. 4b is a sectional model diagram of information elements recorded in the form of unevenness. (It is substantially impossible to indicate precise dimensions in the figures.)

In these figures, a single information track 26 on the disk has a fixed width. A dotted line 72 is the locus of the center of the microspot 29, i.e., the center track of the information groove 26. A one-dot chain line 70 is the swing center line of the center track 72. Numerals 60,61, and 62 indicate information elements. The information elements 60,61, and 62 have been subjected to frequency modulation, pulse width modulation or pulse position modulation, and have been recorded in binary form. Although, in the figures, uneven recording is exemplified, the information may be recorded in gradation form or in magnetic quantites.

The swing locus of the information groove 26 is generated because the working beam is swung at the predetermined frequency $f_o$ in the foregoing information recording apparatus. The frequency of the swing locus is equal to the predetermined frequency $f_o$.

Where the recording is made at the same recording density as in FIG. 1, the width of the information groove 26 is approximately 1 μm. The swing amplitude of the center track 72 should have a peak-to-peak value of approximately 0.3 to 0.4μ. Thus, the information can be satisfactorily recorded without overlap between the adjacent information tracks by enhancing the machine precision of the information recording apparatus.

A method and apparatus for reproducing information according to this invention will be subsequently explained with reference to FIG. 5 and FIGS. 6a and 6b.

Figure 5:
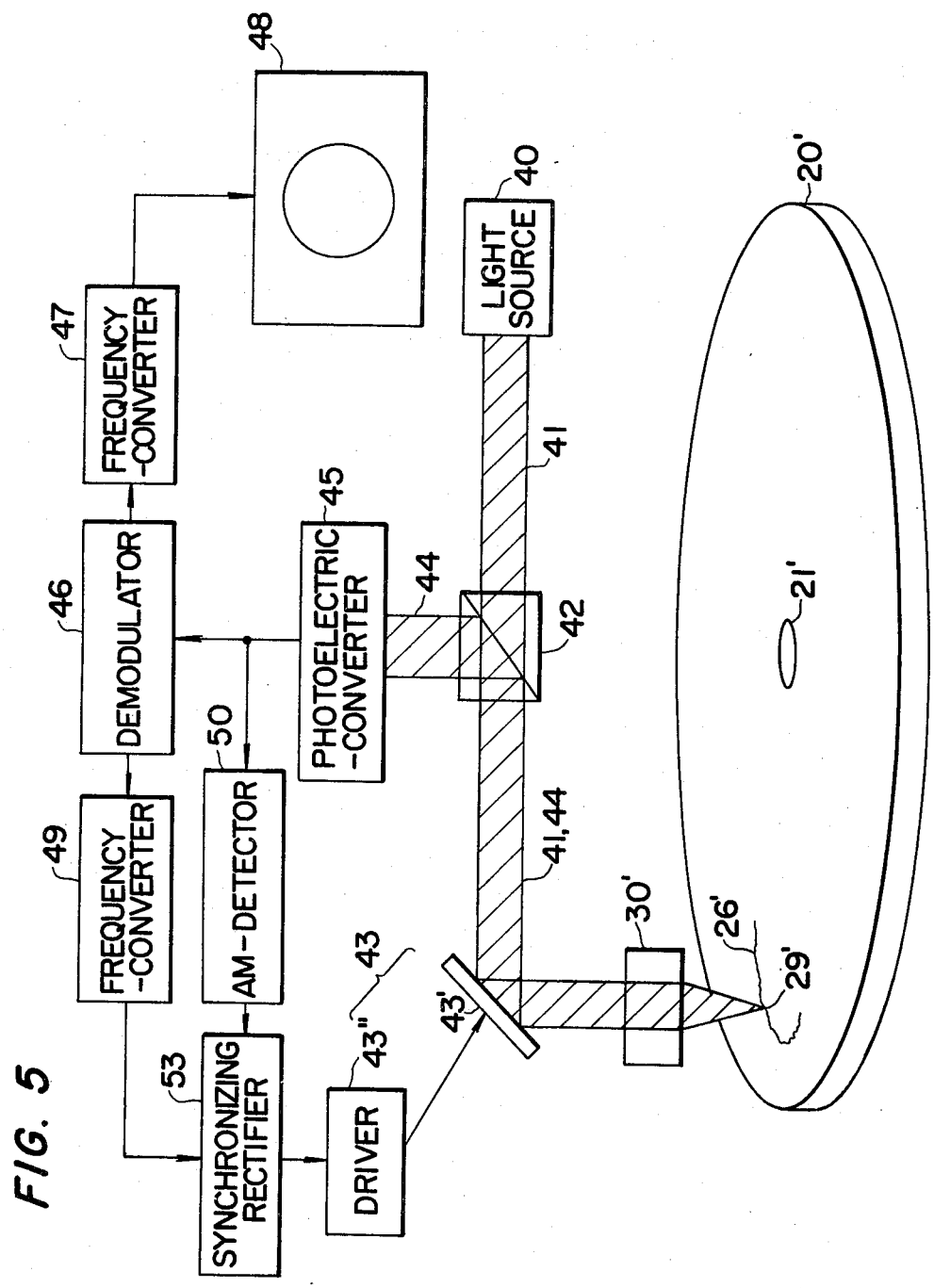
FIG. 5 is a diagram of an embodiment of an information reproducing system according to this invention.

FIG. 5 shows an embodiment of the information reproducing apparatus according to this invention, in which numeral 40 indicates a light beam source such as laser generating means, 41 and 44 a light beam, 42 a beam splitter, 43 light deflecting means (43' a light deflector, 43" a driver circuit), 45 photoelectric conversion means, 46 demodulating means, 47 frequency converter (as stated in the explanation of the information recording apparatus in FIG. 2, the trap filter for the synchronous detection signal $f_o$ is employed in the event that the frequency converter 35' is not used on the recording side), 48 information displaying means, 49 frequency converter (in the event that the frequency converter 35 is not used on the recording side, a narrow-band filter for taking out the synchronous detection signal $f_o$ is employed), 50 AM detecting means, 51 an output signal of the photoelectric conversion means 45,52;52' and 52" output signals of the AM detecting means 50, and 53 synchronous rectification means. Further, 20' denotes a disk prepared by the recording method of this invention or a copy disk thereof, 21' the center of the disk 20', 26' an information track formed spirally, 30' a condensing optical system, and 29' a micro spot of light.

The operation of the information reproducing system is explained below. The light beam 41 is generated from the light beam source 40 such as He-Ne laser. Passing through the beam splitter 42 and through the light deflecting means 43 as well as the condensing optical system 30', the light beam forms microspot 29' on the information track 26' on the rotating disk 20'. Of course, at this time, the rotating mechanism for rotating the disk at a fixed speed and the mechanism for moving the microspot 29' from the outer edge of the disk 20' towards the center of rotation 21' at a fixed speed, i.e., for moving the light deflecting means 43 and the condensing optical system 30' are operating. The above-mentioned tracking system of this embodiment, with the exception of the feature of vibrating the deflector at a standard frequency, is substantially equivalent to the tracking system of the embodiment shown in FIG. 2 and is so well known in the art that they are not shown.

Let it be supposed that, when the disk 20' is rotating, the center of rotation 21' has no eccentricity. Then, with the rotation of the disk and the movement of the microspot 29' towards the disk center, the microspot 20' scans on the swing center line of the center track of a specific information track, for example, the information track 26'. The reflection beam 44 of the beam spot 29' from the information track 26' passes through the condensing optical system 30' as well as the light deflecting means 43. Thereafter, it is reflected by the beam splitter 42, and becomes an input to the photoelectric conversion means 45. It is converted into an electric signal, and the output signal 51 becomes an input to the demodulator circuit 46. Here, the signal subjected to the modulation in the information recording apparatus previously described in detail is demodulated. Only the information signal is taken out by the information signal demodulating means 46 such as a PWM (pulse width modulation) demodulator and frequency converter 47 and is displayed by the information display means 48. On the other hand, the output electric signal 51 of the photoelectric conversion means 45 is also supplied to the AM detecting means 50. It is delivered as the envelope signal 52 of the output electric signal 51, which becomes one of the inputs of the synchronous rectification means 53. Part of the signal demodulated by the demodulating means 46 (i.e.—multiplied standard $nf_o$) is delivered to the frequency converter 49, which converts the input signal having a frequency of $nf_o$, into a standard signal having a frequency $f_o$, and the output of converter 49 is the other input of the synchronizing rectifier 53. The in-phase component of the synchronous detection standard signal $f_o$ in the envelope signal 52 is delivered from the synchronizing rectifier 53, and becomes the tracking control signal. The solarity and amplitude of the output signal represent the direction and magnitude of the offset between the beam spot 29' and the swing center line of the center track of the information groove 26' respectively. Therefore, when the light deflecting means 43 is operated with the output signal so as to compensate for the offset, the information can be always read out and reproduced in regular sequence. Of course, the output signal or the tracking control signal is null in this case, (as shown by 52 in FIG. 6b) because it has been supposed that the disk 20' has no eccentricity and that the microspot 29' is, accordingly, scanning on the swing center line 70 of the center track of the information groove 26'.

As previously explained, however, the center 21' of the disk 20' is inevitably eccentric. Although the eccentricity differs in dependence on the machining error of the disk, an eccentricity of approximately 50 $\mu$m usually exists.

A tracking mechanism for reading out the information from the disk with such eccentricity in regular sequence, will be explained more definitely with reference to FIGS. 6a and 6b.

FIG. 6a is a diagram which shows in three cases the positional relation between the information groove 26' on the disk 20' and the microspot for reproduction 29'. FIG. 6b shows the output signal 51 which is read out in the three cases and converted by the photoelectric conversion means 45, and the envelope signals 52, 52' and 52" thereof. In the figures, 71, 71' and 71" indicate the loci of the center of the microspot 29'. The locus 71 is coincident with the swing center line 70 of the center track of the information groove 26'. The envelope signals 52, 52' and 52" correspond to the respective loci 71,71' and 71". 73, 74, and 75; 73', 74' and 75' and 73", 74" and 75" indicate the maximum amplitude points of the envelope signals corresponding to the respective loci.

Where the center line of the microspot 29' is 71, i.e., where the disk 20' rotates with the center line always kept coincident with the swing center line 70 of the center track of the information groove 26' the electric signal 51 obtained from the photoelectric conversion means 45 becomes, as shown in FIG. 6b, an electric signal of frequency modulation, pulse width modulation or pulse position modulation with its amplitude modulated. The amplitude of the electric signal 51 in this case becomes a maximum at the points at which the center of the microspot 29' concides with the center track 72 of the information groove 26', i.e., at the points 73, 74 and 75. At the points at which the microspot center departs from the center track 72, the amplitude decreases. More specifically, letting T be the period of the swing of the information groove 26', the amplitude decreases twice during the period T. Consequently, the envelope signal 52 of the output signal 51 is composed of a frequency component which is twice the swing frequency $f_o$ of the information groove 26'.

Where the disk 20' rotates with the center loci 71' and 71" of the microspot 29' deviating on the pulus side and the minus side from the swing center line 70 of the information groove 26' as shown in FIG. 6a, respectively, the envelope signals of the output signal 51 produced are those 52' and 52'' as shown in FIG. 6b, respectively.

The envelope signals 52, 52', and 52'' of the output signal 51 contain information on the magnitude and direction of the offsets of the center loci 71, 71' and 71'' of the microspot 29' from the swing center line 70 of the information groove 26' in FIG. 6a, respectively. More specifically, as is seen in FIGS. 6a and 6b, where the center locus of the microspot 29' deviates from the swing center line 70 of the information groove 26' on the plus side as illustrated at 71', when the corresponding envelope signal 51' is compared with the envelope signal 51 in the case of the center locus 71, it decreases at points intermediate between the points 73' and 74' and increases at points between the points 74' and 75'. In contract, where the center locus deviates from the swing center line 70 of the information groove 26' on the minus side as illustrated at 71'', when the corresponding envelope signal 51'' is compared with the envelope signal 51, it increases at points intermediate between the points 73'' and 74'' and decreases at points intermediate between the points 74'' and 75''. Each of the envelope signals 52, 52' and 52'' is of such a form that the signal of the component of the swing frequency $f_o$ of the information groove 26' is added to the envelope signal of a signal with a frequency being twice the swing frequency $f_o$ in correspondence with the sense and quantity of the offset of the center locus of the microspot 29' from the swing center line 70 of the information groove 26'. Therefore, when the in-phase component of the swing frequency $f_o$ is derived from the envelope signal 52,52' or 52'', the derived signal becomes the tracking control signal, incicating in which sense and by what amount the center of the microspot 29' deviates from the swing center line 70 of the information groove 26'.

By setting the swing frequency $f_o$ to be higher than the frequencies of the stray light noise, the process of deriving the in-phase component is not influenced by the stray light noises, and a tracking control signal of good signal-to-noise ratio can be derived.

Means for deriving the tracking signal is the synchronous rectification means 53, shown in FIG. 5 and explained previously, to which the synchronous detection standard signal $f_o$ and the envelope signal 52,52' or 52'' are delivered. The output signal of the synchronous rectification means 53, i.e., the tracking control signal becomes opposite in sign in dependence on whether the offset of the center of the microspot 29' from the swing center line 70 of the information groove 26' is on the plus side or on the minus side in FIG. 6a. The sense of the offset is, therefore, detectible. Needless to say, where the envelope is that of signal 52, it is constituted only of the 2 $f_o$-component and does not contain the $f_o$-component, so that the tracking signal becomes zero.

As is apparent from the above explanation, the output signal from the synchronous rectification means 53 or the tracking control signal indicates the sense and magnitude of the offset of the center of the microspot 29' from the swing center line 70 of the information groove 26'. Therefore, the offset of the microspot 29' can be corrected by delivering the output signal to the light deflecting means 43. The light deflecting means 43 is constructed of the light deflector and the driver circuit therefor. The deflecting direction of the light deflector is, naturally, the radial direction of the disk, i.e., the direction perpendicular to the swing center line 70 of the information groove 26'. The magnitude and sense of the deflection are controlled by the signal from the driver circuit. Now, where the center of the microspot 29' deviates on the plus side shown in FIG. 6a, the light deflector is naturally deflected onto the minus side in correspondence with the magnitude of the deviation, and the center of the microspot is brought into coincidence with the swing center line 70 of the information groove 26'. Accordingly, the microspot 29' can automatically track without deviating from a certain specific track of the information groove even in the presence of the eccentricity of the disk, and the information recorded on the disk can be read out and reproduced errorlessly.

Although, in connection with FIG. 5, the information reproducing apparatus has been described as detecting the reflected light, it is needless to say that the transmitted light may be detected. In that case, the beam splitter is naturally unnecessary. Instead, a condensing optical system and a mechanism for moving it from the outer edge towards the center of the disk are further required.

As has thus far been described in detail, by employing the method and apparatus for recording and reproducing information according to this invention, it is possible to record information on a disk at a high density and to read out and reproduce the recorded high-density information in regular sequence and accurately with an inexpensive reproducing apparatus, particularly in the field of use such as video disk.

This invention has eliminated the disadvantage of the prior-art method previously referred to which uses a plurality of photodetectors, i.e., the disadvantage that, since the frequency bands of the stray light noise and the tracking control signal overlap, the tracking control signal cannot be accurately detected. That is, the method and apparatus of this invention are not affected by stray light noise because, as stated above, the eccentricity of the disk is not the tracking control signal, but the tracking control signal is detected through the synchronous detection signal $f_o$.

The prior art requires at least two photodetector means of the same performance in the information reproducing system, whereas this invention requires only one photodetector means. Moreover, it is unnecessary to make the size of the single photodetector means as small as in the prior art. Also in these respects, the invention is advantageous.

Furthermore, since any mechanism of high precision is not required in the reproducing system, a reproducing system of very low cost is obtained.

We claim:

1. In a method for recording and reproducing information, wherein a working beam modulated by an information signal is caused to impinge on a rotating disk, and the position of impingement is moved from the outer edge towards the center of the disk, to thereby record an information track, and wherein, in order to reproduce recorded information, a light beam is caused to impinge on the rotating disk, the position of impingement is moved from the outer edge towards the center of the disk, detected secondary light of the light beam is converted into an electric signal, and an information signal is derived from the electric signal, an improved method for recording and reproducing information in which:
 (i) the recording step comprises:
  (a) adding a standard signal for synchronous detection to the information signal and subjecting the resultant signal to binary modulation,
(b) modulating the intensity of the working beam with a signal obtained by step (a), and
(c) causing the resultant working beam to impinge on the disk while said resultant working beam is being minutely swung in the radial direction of said disk by a signal having the same frequency and phase as the synchronous detection standard signal, and (ii) the reproducing step comprises:
(d) deriving said synchronous detection standard signal from a signal obtained by causing a light beam to impinge on the information track on said disk as formed by said recording step (i) and by detecting the light which has impinged on said information track, and synchronously rectifying an envelope signal of said signal, obtained by the impingement of said light beam, with the derived synchronous detection standard signal,
(e) making corrections with a signal obtained by step (d) so that said light beam may precisely follow said information track, and
(f) reproducing said information signal from the photoelectrically converted signal.

2. A method in accordance with claim 1, wherein in step (a) of adding said synchronous detection standard signal to said information signal, the frequency of said synchronous detection standard signal is set outside the information signal band.

3. A method in accordance with claim 1, wherein the frequency of said synchronous detection standard signal is set outside frequency components of stray light.

4. In an apparatus for recording and reproducing information wherein a working beam modulated by an information signal is caused to impinge on a rotating disk, and the position of impingement is moved from the outer edge towards the center of the disk, to thereby record an information track, and wherein, in order to reproduce the recorded information, a light beam is caused to impinge along the information track on the rotating disk, secondary light of the light beam is converted into an electric signal by photoelectric conversion means, and the information are derived from the electric signal,
an improved apparatus for recording and reproducing information in which:
the recording device comprises
adding and modulating means to add a standard signal for synchronous detection to the information signal and to subject the resultant signal to binary modulation,
means to subject the working beam to intensity modulation with an output signal from said adding and modulating means, and
deflecting means to minutely swing the resultant modulated working beam in the radial direction of the disk by a signal having the same frequency and phase as the synchronous detection standard signal, and wherein
the reproducing device comprises:
means to derive said synchronous detection standard signal from an electric signal obtained by causing a light beam to impinge on the information track on said disk formed by said recording device and photoelectrically converting the secondary light,
means to synchronously rectify an envelope signal of said electric signal with the derived synchronous detection standard signal,
deflecting means to make corrections with a signal obtained by the synchronously rectifying means, so that said light beam may precisely follow said information track, and
means to derive said information signal from said electric signal.

5. In an apparatus wherein a working beam modulated by an information signal is caused to impinge on a disk rotating at a predetermined speed, and the position of impingement is moved from the outer edge towards the center of the disk at a fixed speed with the rotation of the disk, to thereby record information,
an improvement for recording information which comprises:
adding and modulating means for adding the information signal and a standard signal for synchronous detection and to subject the resultant signal to binary modulation,
means to subject the working beam to intensity modulation with an output signal from the first-mentioned means, and
deflecting means to minutely swing the resultant modulated working beam in the radial direction of the disk by a signal having the same frequency and phase as the synchronous detection standard signal.

6. An apparatus in accordance with claim 5, wherein said working beam is a laser beam, said intensity modulating means is an optical modulator for said laser beam, and said minutely swinging means comprises a light deflector and a driver therefor, for said laser beam.

7. An apparatus in accordance with claim 5, wherein said working beam is an electron beam generated by a cathode and a control electrode of an electron gun and said minutely swinging means comprises a deflecting coil.

8. An apparatus in accordance with claim 5, wherein said working beam is an electron beam generated by a cathode and a control electrode of an electron gun, and said minutely swinging means comprises a deflecting electrode.

9. An apparatus in accordance with claim 6, wherein there is included means for causing said laser beam to impinge on said disk, comprising a condensing optical system to converge said laser beam into a microspot.

10. An apparatus in accordance with claim 7, including means for causing said electron beam to impinge on said disk, comprising an electron lens to converge said electron beam into a microspot.

11. An apparatus in accordance with claim 8, including means for causing said electron beam to impinge on said disk, comprising an electron lens to converge said electron beam into a microspot.

12. In an apparatus for reproducing information from a disk having recorded information thereupon and being rotated at a predetermined speed, and wherein a light beam is caused to impinge on the disk and is moved from the outer edge towards the center of the disk at a fixed speed with the rotation of the disk, the secondary light thus obtained from the disk surface is converted into an electric signal by photoelectric conversion means, and the information signal is derived from the electric signal,
an improvement for reproducing information which comprises:

means to derive a synchronous detection signal from said electric signal, means to synchronously rectify said envelope signal with said synchronous detection signal, and light deflecting means to correct an offset between said light beam and the information groove in conformity with an output of the synchronously rectifying means.

13. In an apparatus for reproducing information from a disk having recorded information thereupon and being rotated at a predetermined speed, and wherein a light beam radiated from a light beam source is caused to impinge on the disk through deflecting means and a condensing optical system, the deflecting means and the condensing optical system are moved from the outer edge towards the center of the disk with the rotation of the disk, the secondary light thus obtained from the information groove on the disk is converted into an electric signal by photoelectric conversion means, and the information signal is derived from the electric signal, an improvement for reproducing information which comprises:

means to derive an envelope signal of said electric signal, means to demodulate binary modulation of said electric signal and to derive a synchronous detection standard signal, means to synchronously rectify said envelope signal with said synchronous detection signal, means to apply an output of the synchronously rectifying means to said deflecting means, and means to demodulate the binary modulation of said electric signal and to derive said information signal.

14. An apparatus in accordance with claim 13, wherein reflected light is used as said secondary light, and a beam splitter is arranged between said light beam source and said deflecting means, so that said reflected light is reflected by said beam splitter, so as to be introduced into a light receiving surface of said photoelectric conversion means.

15. An apparatus for recording and reproducing information comprising:

first means for providing an energy beam;

second means for modulating said energy beam during the recording operation with a combined information signal and prescribed synchronizing signal; and third means for displacing the modulated energy beam during the recording operation in accordance with said prescribed synchronizing signal and directing the displaced and modulated energy beam onto a selected position on a recording medium.

16. An apparatus according to claim 15, wherein said recording medium is one which is continuously displaced during the recording operation of said apparatus, so that said selected position continuously changes with time.

17. An apparatus according to claim 16, wherein said recording medium is a rotatable medium and said selected position follows a spiral-shaped path on said recording medium.

18. An apparatus according to claim 15, wherein said first means comprises means for providing a beam of coherent optical energy.

19. An apparatus according to claim 15, wherein said first means comprises means for generating an electron beam.

20. An apparatus according to claim 15, wherein the frequency of said synchronizing signal lies outside the frequency band making up said information signal.

21. An apparatus according to claim 15, wherein the frequency of said synchronizing signal lies outside the frequency components of stray energy capable of being recorded on said recording medium.

22. An apparatus according to claim 15, further comprising:

fourth means for directing an energy beam during the reproducing operation onto said selected position of said recording medium and for deriving from the beam reflected therefrom an electric signal representative of the signal recorded at said selected position; and fifth means, connected to said fourth means, for demodulating said derived electrical signal during the reproducing operation and for controlling the directing of said energy beam onto said selected position of said recording medium in accordance with the component of said prescribed synchronizing signal in said recorded signal;

whereby said information signal will be accurately demodulated and reproduced.

23. An apparatus according to claim 22, wherein said recording medium is one which is continuously displaced during the recording and reproduction operation of said apparatus, so that said selected position continuously changes with time.

24. An apparatus according to claim 23, wherein said recording medium is a rotatable medium and said selected position follows a spiral-shaped path on said recording medium.

25. A recording medium wherein information is stored on alternative regions in an optically readable structure, said alternative regions being interspersed with intermediate regions in track form, said alternative regions providing a different effect than said intermediate regions and regions between tracks when an optical read beam impinges thereon;

characterized in that the track presents a periodic meander in direction crossing the read track direction and in a direction parallel to the surface of the recording medium, with the period of the meander being substantially larger than the mean period of the intermediate regions in the track, and the amplitude of the meander being smaller than the width of the track.

26. A record carrier on which information is stored in an optically readable structure of trackwise arranged areas alternating with intermediate areas, which areas have a different effect on a read beam of radiation than the intermediate areas and the land between the tracks, wherein the tracks, viewed in a direction transverse to the direction in which the tracks are read and in a direction parallel to the surface of the record carrier, exhibit periodic excursions, the period of said excursions being substantially greater than the average period of the areas in the tracks and the amplitude of said excursions being smaller than the track width.

27. An apparatus for reading a record carrier on which information is stored in an optically readable structure of trackwise arranged areas alternating with intermediate areas, which areas have a different effect on a read beam of radiation than the intermediate areas and the land between the tracks, wherein the tracks, viewed in a direction transverse to the direction in which the tracks are read, exhibit periodic excursions, the period of said excursions being substantially greater than the average period of the areas in the tracks and the amplitude of said excursions being smaller than the track width; comprising a radiation source which supplies a read beam of radiation and a radiation sensitive detector for converting the read beam of radiation which has been modulated by the sequence of areas and intermediate areas in the track into an electrical signal, wherein the output of the radiation sensitive detector is connected to a first and second means, said first and second means provided for extracting from the output of said radiation sensitive detector information components and control signals respectively.

28. An apparatus for writing information on a record carrier on which information is stored in an optically readable structure of trackwise arranged areas alternating with intermediate areas, which areas have a different effect on a read beam of radiation than the intermediate areas and the land between the tracks, wherein the tracks, viewed in a direction transverse to the direction in which the tracks are read, exhibit periodic excursions, the period of said excursions being substantially greater than the average period of the areas in the tracks and the amplitude of said excursions being smaller than the track width;

comprising a radiation source which supplies a write beam of radiation and an optical modulation device for varying the intensity of the light beam of radiation in accordance with the electrical signal which represents the information to be written, wherein a beam deflection device is provided for the periodic displacement of the radiation spot formed on the record carrier body by the write beam of radiation in a direction transverse to the longitudinal direction of the tracks to be written, the amplitude of the displacement being smaller and the period of the displacement being substantially greater than the dimensions of the radiation spot.

29. In an apparatus for reproducing information from a disk having recorded information thereupon and being rotated at a predetermined speed, and wherein a light beam radiated from a light beam source is caused to impinge on the disk through deflecting means and a condensing optical system, the deflecting means and the condensing optical system are moved from the outer edge towards the center of the disk with the rotation of the disk, the secondary light thus obtained from the information groove on the disk is converted into an electric signal by photoelectric conversion means, and the information signal is derived from the electric signal, an improvement for reproducing information which comprises:

means to derive an envelope signal of said electric signal, means to demodulate binary modulation of said electric signal and to detect a synchronous detection signal from said electric signal, means to synchronously rectify said envelope signal with said synchronous detection signal, means to apply an output of the synchronously rectifying means to said deflecting means, and means to demodulate the binary modulation of said electric signal and to derive said information signal.

30. A record carrier on which information is stored in an optically readable structure in the form of first areas alternating with second areas along tracks with lands between successive tracks, said first areas having a different effect on impinging radiation than the second areas and the lands between the tracks, the improvement wherein the tracks, viewed in a direction transverse to the direction in which the tracks are read, are provided with periodic track centering excursions extending towards and away from adjacent tracks, the amplitude of said excursions being smaller than the track width.

31. An apparatus for reading a record carrier on which information is stored in an optically readable structure in the form of first areas alternating with second areas along tracks with lands between successive tracks, the first areas having a different effect on impinging radiation than the second areas and the lands between the tracks, wherein the tracks, viewed in a direction transverse to the direction in which the tracks are read, are provided with periodic track centering excursions extending towards and away from adjacent tracks, the amplitude of the excursions being smaller than the track width; comprising a radiation source which supplies a read beam of radiation and a radiation sensitive detector for converting the read beam of radiation which has been modulated by the sequence of first and second areas in the track into an electrical signal, wherein the output of the radiation sensitive detector is connected to a first and second means, said first and second means provided for extracting from the output of said radiation sensitive detector information components and control signals, respectively.

32. A record carrier on which information is stored in an optically readable structure in the form of first areas alternating with second areas along tracks with lands between successive tracks, said first areas having a different effect on impinging radiation than the second areas and the lands between the tracks, the improvement wherein the tracks, viewed in a direction transverse to the direction in which the tracks are read, are provided with portions periodically displaced from the track center line axis alternately on opposite sides of the center line axis, the amount of displacement from the center line axis being smaller than the track width.

* * * * *